United States Patent [19]

Meltsch

[11] Patent Number: 4,639,546
[45] Date of Patent: Jan. 27, 1987

[54] INSERT FOR A CABLE SLEEVE AND METHOD FOR THE PRODUCTION THEREOF

[75] Inventor: Hans-Jürgen Meltsch, Schwerte-Ergste, Fed. Rep. of Germany

[73] Assignee: Siemens Aktiengesellschaft, Munich, Fed. Rep. of Germany

[21] Appl. No.: 790,559

[22] Filed: Oct. 23, 1985

[30] Foreign Application Priority Data

Oct. 30, 1984 [DE] Fed. Rep. of Germany ....... 3439711

[51] Int. Cl.$^4$ .................... H02G 15/08; H01R 43/00
[52] U.S. Cl. ........................................ 174/92; 29/868; 156/49; 174/93; 174/DIG. 8
[58] Field of Search ..................... 174/92, 93, DIG. 8; 29/868, 869; 156/49

[56] References Cited

U.S. PATENT DOCUMENTS

| | | | |
|---|---|---|---|
| 3,879,574 | 4/1975 | Filreis et al. ........................ | 174/76 |
| 4,142,592 | 3/1979 | Brusselmans ........................ | 174/92 |
| 4,472,222 | 9/1984 | Moisson et al. ........... | 174/DIG. 8 X |
| 4,511,611 | 4/1985 | Moisson ........................... | 174/92 X |

FOREIGN PATENT DOCUMENTS

| | | |
|---|---|---|
| 7930401 | 3/1980 | Fed. Rep. of Germany . |
| 1065431 | 4/1967 | United Kingdom . |
| 2059873 | 4/1981 | United Kingdom . |

*Primary Examiner*—Arthur T. Grimley
*Assistant Examiner*—Morris H. Nimmo
*Attorney, Agent, or Firm*—Jeffrey P. Morris

[57] ABSTRACT

This invention involves an insert (1) for a shrinkable cable sleeve of heat-resistant and water vapor-impermeable material with a longitudinally split central part (2) and at least one lateral part (10) which has incisions (4, 4a) for the formation of a conical transition. The incisions (4, 4a, 5) in the lateral part (10, 13) are cut obliquely to the longitudinal direction of the insert (1) through an incision angle (EW), so that obliquely projecting strips (3, 7, 8) are formed which, after the insert (1) has been wrapped, for example, around a cable splice, can be turned in spirally to form conically extending transition areas.

37 Claims, 13 Drawing Figures

INSERT FOR A CABLE SLEEVE AND METHOD FOR THE PRODUCTION THEREOF

BACKGROUND OF THE INVENTION

1. Technical Field

The invention relates to the field of electrical cables, and more particularly to an insert for a cable sleeve, consisting of an approximately rectangular central part and at least one contiguous lateral part which has incisors starting from at least one outwardly directed end, whereby strips are formed which serve to bridge the difference in diameter between the central part and an introduced electrical cable, the sleeve for mounting on, for example, a cable splice.

2. Description of the Prior Art

From German industrial design registration GM No. 79 30 401, a cable sleeve insert is known where triangular areas are cut out laterally, so that there result triangular tongues coming to a point at the outer ends. After the sleeve has been wrapped, these triangular tongues are bent inwardly around the respective cable splice, until they touch the introduced cable. Depending on the difference in diameter, however, this causes the formation of more or less large, free or exposed areas, which, due to the triangular shape of the cutouts, are not covered, so that a permeation barrier hardly exists in these regions. Furthermore, depending on the diameter of the introduced cable, the transitional region is more or less wide, so that the sleeve length varies in accordance with the cable diameter. Also, the supporting action is relatively slight in this region, as the tongues are merely bent inwardly and will flex depending the load applied from the outside.

Further, from British Pat. No. 1,065,431 another cable sleeve insert of the above kind is known. Longitudinal incisions in the lateral parts form lengthwise projecting strips which, as with the above-described insert, are bent inwardly onto the cable sheath, so that here too an approximately conical transitional area between the central part of the insert and the introduced cable results. In this case problems with the strips to be bent-in arise during installation because, on being pressed together, the individual strips may lock one against the other. It is necessary, therefore, to bend the strips one after the other in an orderly manner, so that they partly overlap on the circumference of the cable sheath. This requires a great deal of installation time and concentration. Yet the transitional region is not secured against being squashed from the outside here either, as the strips are only bent to the side unless the insert consists of an especially sturdy material. Furthermore, here too the sleeve length depends on the difference in diameter, as the strips always have the same length regardless of the difference in diameter to be overcome in the particular instance. As a result, it may be that with this one insert type only a relatively small range of diameter differences can be bridged.

SUMMARY OF THE INVENTION

For the present invention the problem now is to form the inserts for cable sleeves so that the transitional region can be produced with great strength in a defined length and in a wide range of diameter differences to be bridged, while the production of the inserts in the cable sleeve is to be possible with an especially simple operation. Now the problem posed is solved by means of an insert of the initially explained kind by the fact that incision angles for the incisions in the lateral part are made to extend obliquely in the same direction relative to the longitudinal axis of the insert in such a way that in the mounted state of the insert the strips can be turned into the reduced diameter.

Also, the insert is produced by a method according to the invention such that the rectangular central part is wound around the material to be wrapped, the obliquely projecting strips of the respective lateral part are turned inwardly by a light application of pressure and with a simultaneous rotational movement in the direction given by the incision angles to the reduced diameter of the introduced material, and a protective covering is applied over this mounted insert.

With inserts according to the invention, one of the advantages is that the adaptation in the transitional region at the lateral parts can be effected by a very simple assembly operation. This assembly operation consists essentially of a rotational movement with a slight pressure onto the strips formed at the lateral parts. By the oblique incisions, which are an additional factor in the principle of the invention, not only the rotational movement but also the direction of rotation is given, which corresponds to the direction of the oblique incisions. Now during the turning process, the obliquely projecting strips automatically place themselves inwardly, while at the same time layering themselves one over the other like a fan, thus forming a fully covered transitional area. The transition can be made more or less steep, as needed, by varying the degree of involution, whereby at the same time a defined length can be produced. Further, also, the difference to be bridged between the diameter of the lapped central part of the insert and the diameter of the introduced cable can be regulated within wide limits through the degree of involution of the strips. Due to the involution of the strips, there results moveover an increased stiffness of this transitional region. This in particular is accomplished if the lateral parts are coated with fusion adhesive, so that through the subsequent gluing an especially rigid structure results. Lastly, this method and structure results in a full permeation protection, as the individual strips overlap.

Of special advantage further is the transitional regions can be formed by a simple method, namely by involution of the strips at the lateral parts. Thereby, as has been described above, the desired stiffness, the adaptation of the transitional region with regard to stiffness and hence also with regard to length, and a full permeation protection are obtained automatically.

Another advantage is that the winding length of the insert itself can be shortened, as the stability is improved by the supporting action and the overlap of the individual strips in the transitional region. By a correspondingly high number of incisions, that is, of relatively narrow strips, the reinforcements in the central part of the insert, for example, in the form of reinforcement edges, are no longer dependent on the number of incisions at the end, as they are made to be relatively closely adjacent. Nor is there any more a dependence on the longitudinal break edges of the insert, for the insert may be made from a tape coil by cutting a required section to length.

BRIEF DESCRIPTION OF THE DRAWINGS

The invention will now be explained more specifically in detail with reference to thirteen figures.

DETAILED DESCRIPTION

Figure 1:
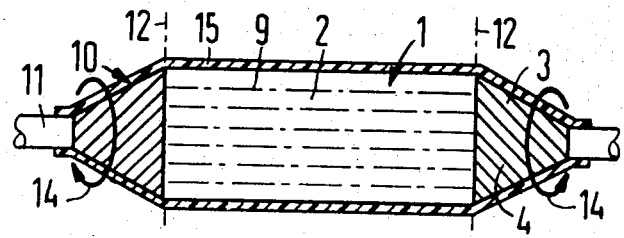
FIG. 1 shows a mounted cable insert according to the invention.

FIG. 1 illustrates schematically an insert 1 mounted on a cable splice with its approximately cylindrical central part 2 and the two lateral parts 10 tapering conically toward the introduced cables 11. The two lateral parts 10 are produced by involution of the strips 3 formed by the oblique incisions 4. This results in a spiral structure, only indicated and not clearly shown in the figure, of the partially overlapping strips 3. It is, however, clearly visible that the incisions 4 of the lateral parts 10 are executed obliquely to the longitudinal axis of the insert 1, so that the strips 3 can be turned inwardly at an angle along the peripheral bending edge 12. By the degree of involution, the lengths of the lateral parts 10 and hence also the length of the cable sleeve can be varied and adapted according to the requirements. Of special advantage is the fact that by the involution of the strips 3 in the regions of the lateral parts 10 always a continous ("closed") covering of the entire region takes place. This means that the permeation protection in these regions is impaired only by the incisions, meaning that free spaces or openings no longer exist in these regions. By appropriate coating of the strips 3 with fusion adhesive, with some other sealant or by wrapping in an aluminum tape, the permeation protection can be further improved. In addition, by the overlapping involution of the strips, the supporting action is increased, so that on the whole the insert is further strengthened. Additionally, embossed break or bending lines 9 are visible in the central part 2, which provide, on the one hand, for easier winding and, on the other, for a further stiffening in this central region. The two arrows 14 at the lateral parts 10 indicate the direction of rotation for the spiral involution of the lateral strips 3.

Over the insert 1 (for example, as a covering 15), the cable sleeve is shown to comprise a covering, for example, of heat-shrinkable material.

Figure 2:
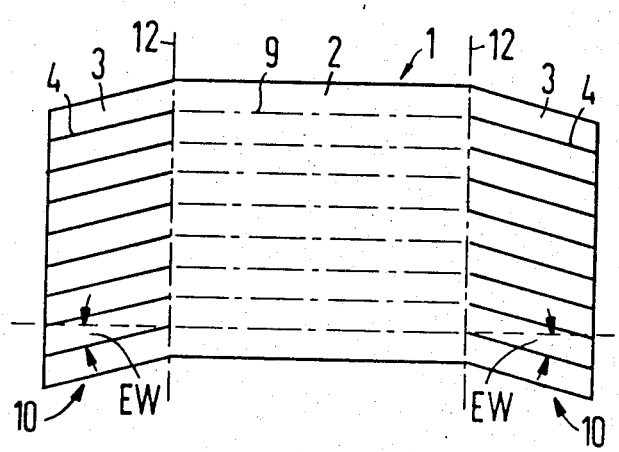
FIG. 2 shows an insert before assembly, in which the lateral incisions along both lateral parts have been cut in opposite angle direction.

The insert 1 according to the invention as per FIG. 2 consists of an approximately rectangular central part 2, which for wrapping the material to be protected can be deformed to an approximately cylindrical form, and of at least one—here two—lateral part 10 with incisions 4 extending obliquely under an angle EW to the longitudinal direction, resulting in the individual strips 3. The incisions 4 are here cut into the lateral part 10 to equal depth, so that upon involution of the strips 3 a peripheral bending edge 12 forms In this embodiment the incisions 4 cut at an angle EW to the longitudinal direction are opposite in one lateral part 10 to those in the second lateral part (as the arrows of the incision angle EW indicate), so that the spiral involution of the strips 3 is appropriately also oriented in opposite directions at the two lateral parts 10. Good results for the turning in of the strips 3 are obtained if the incision angles EW in the lateral parts 10 are in the range of 10 to 70 degrees, but preferably between 25 and 50. In the central portion 2 of the insert 1, break or bending edges 9 may make it easier to cut the insert 1 to the required size if it is supplied for example as a coil of sheeting of great length.

Figure 3:
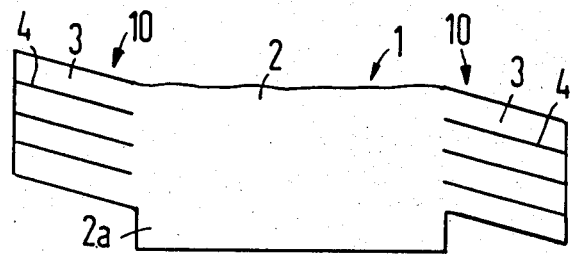
FIG. 3. shows an insert with codirectional incisions at both lateral parts.

FIG. 3 shows a modified embodiment for an insert 1 according to the invention, where the incisions 4 in one lateral part 10 have the same direction as those in the second lateral part 10. It follows that the turning in of the strips 3 should be in the same direction on both sides. In this embodiment a projection 2a is added at the central part 2 which, when applying the insert 1, is placed over or under its other end, so that the longitudinal slit in the central part 2 is covered. This longitudinal overlap in the central part 2 does not affect the edge portions 10, so that there results no multiple superposition of strips 3, which would lead to a bulkier application of material after the turning in. For the rest, the situation is the same as in the embodiment of FIG. 1.

Figure 4:
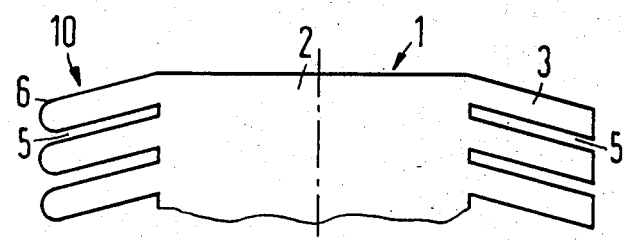
FIG. 4 shows an embodiment according to the invention, where, as a result of the incisions, narrow jogs have formed.

In FIG. 4 an embodiment is indicated where the incisions are formed as narrow jogs 5, the width of these jogs 5 being such that after involution of the strips 3 again a continuous (closed) transition area forms. It is indicated here further that the ends of the strips 3 may be provided with rounded ends 6 (left lateral part 10), whereby the hazard of damage to the material to be wrapped is reduced. These round ends 6 may, of course, be given to all forms of realization.

Figure 5:
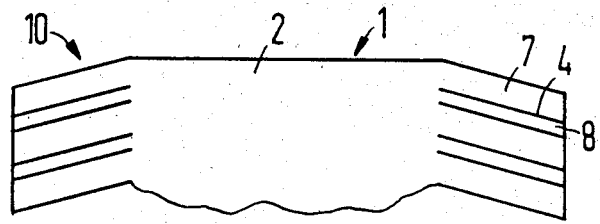
FIG. 5 shows an embodiment according to the invention with incisions at uneuqal distances, so that strips of different width result.

In FIG. 5, an embodiment is indicated where the incisions 4 are made at unequal distances from each other, so that strips 7 and 8 of different width form. This makes for greater adaptability in the region of the lateral parts 10.

Figure 6:
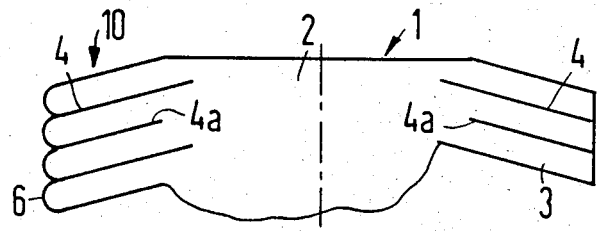
FIG. 6 shows an embodiment with incisions of unequal depth at both lateral parts, so that strips of unequal length result.

FIG. 6 shows an embodiment where in the lateral parts 10 of insert 1 the incisions 4 and 4a have different length, so that a clear bending line can now no longer form from upon involution of the strips 3. Thus it is possible by this measure for example in the case of very steep transitional areas to prevent a sharp break edge. In the left portion of the figure the strips 3 are again provided with rounded outer ends 6, and hereby it is intended to express in a general way that by the combination of the various forms of realization especially favorable conditions can be created.

Figure 7:
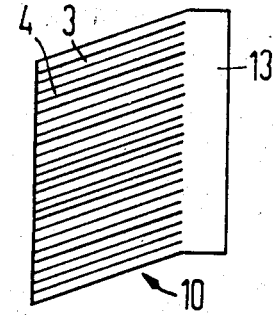
FIG. 7 shows a separate lateral part with incisions, according to the invention, for an insert which is composed of several parts.

FIG. 7 indicates a special variant of the insert according to the invention, only one lateral part 10 being shown here. The entire insert according to this embodiment now consists of a central part of the previously described kind, but which exists as a separate part, and of at least one lateral part 10 of the kind here shown. This lateral part 10 is also made as a separate part and can be applied for example during assembly independently of the central part. It is expediently joined to the central part by gluing, snapping in or locking. The incisions 4 as well as the strips 3 formed thereby may be made according to the previously described patterns, the individual strips 3 being held together at one end by a band type part 13. Besides this manner just described, the insert may also be assembled from these separate parts being installed, so that it can then be wound and treated like the previously described forms of realization.

Figure 8:
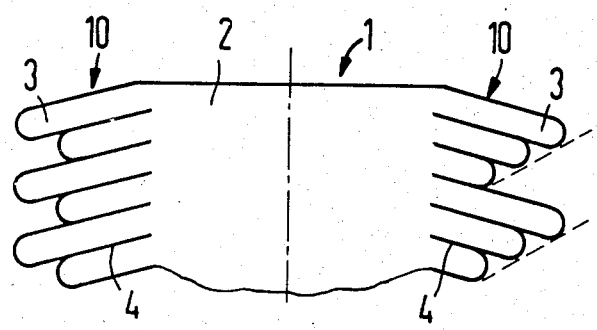
FIG. 8 shows yet another embodiment of the invention where strips of different length result.

FIG. 8 shows still another variant of the invention. On the left side of insert 1 with its central part 2 it is shown that it may be of advantage to make the strips formed by the incisions 4 not of the same length. Thus, here for example alternately long and short strips 3 have been chosen, these being of equal length, however. The short strips 3 are sufficient for a continuous (closed) conical transition to be obtained when lapping in. The advantage is, however, that at the outer end of the lapped-in transition fewer strips 3 overlap, so that in this region the thickness will be less than for strips of equal length. On the right side of this FIG. 8 it is shown that also strips 3 of different length may be chosen so that in this manner the transition can become still more continuous. Here, for example, different shortenings of the strips 3 have been chosen. Also, such shortenings can be made in groups, and even within such a group of strips 3 of three different lengths are disposed, as is indicated, for example, by the dotted line. Such groups of strips 3 may repeat periodically, so that in the end, after the strips 3 have been turned in, again a uniform transition closed by a suitable matching of the individual strips 3 results.

Figure 9:
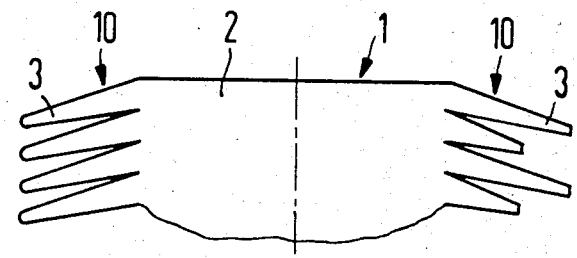
FIG. 9 shows an embodiment having tapered strips.

FIG. 9 explains a further embodiment according to the invention, the individual strips 3 being formed tapered at least in part at their outer ends. By these savings of material in the lateral parts 10, it is again possible to diminish the overlaps at the outer end of the conical transition when turning in the obliqiuely projecting strips 3. The left side of the figure again shows rounded ends of the strips 3. The right side of the figure illustrates again the formation of unequally long strips 3, whereby additional savings of material can be achieved at the ends of the transition, that is, the buildup of material by the strips 3 is minimized still further.

Figure 10:
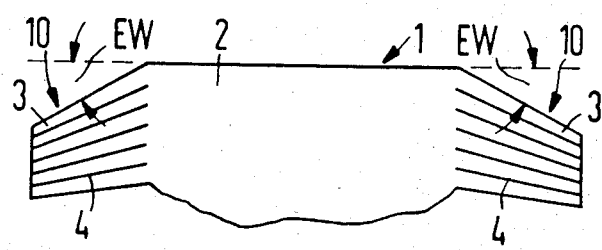
FIG. 10 shows an embodiment exhibiting unequal incision angles.

FIG. 10 shows additionally an embodiment of the invention where the incision angle EW from one incision 4 to the next section 4 is not the same, as in the examples considered so far, but where the angle EW— viewed in the lapping direction—becomes smaller and smaller. In this way further possibilities of adaptation become available; thus, for example, it becomes possible to introduce cables asymmetrically.

Figure 11:
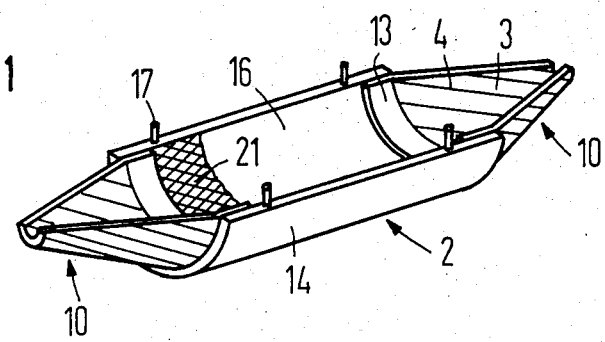
FIG. 11 shows an embodiment having half shells.

FIG. 11 shows an insert according to the invention having two half shells. The insert is formed of a central part 2 and two lateral parts 10. The lateral parts 10 are attached to the central part 2 by clamping, for example, through which the lateral parts 10 in the region of the band formed parts 113 have an outside diameter corresponding to the inside diameter of the central part 2. The individual parts are held together by the insertion of the lateral parts 10 into the central part 2. The half shells consist of mesh, or lattice or braided material 21, covered by a permeation-proof surface layer 16. The surface layer 16 may consist of a composite foil of aluminum backed plastic. Diameter reduction is due to the compressed tabs 3 at both lateral parts 10. Locking pins 17 affix the half shells in the assembled state.

Figure 12:
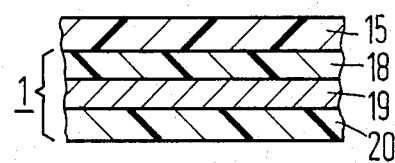
FIG. 12 shows a composite foil having a plurality of different materials.

FIG. 12 shows a composite foil which is composed of a plurality of different materials. These include, for example, layer 19 of heat resistant material, i.e. a metal, and an additional layer of plastic 18. The covering 20 is included in the composite foil 1, which is applied over the insert.

Figure 13:
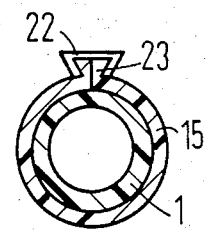
FIG. 13 shows a protective covering drawn over an insert in accordance with an aspect of the invention.

FIG. 13 shows a protective covering 15 drawn over the insert 1 and clamped to it via a clamp, for example, in the form of two protrusions 23 and a clamping groove 22.

To make an insert from separate central and lateral parts has special advantages when it is considered important that only the central part is to be exposed when reopening the cable sleeve. This leaves the conical transitions intact, which can serve as support for the central part to be applied when closing up the splice again. In addition, the seals toward the cable sheath remain intact in the zones of introduction.

The insert according to the invention may be made of a variety of materials, as will be explained more specifically in the following.

It may consist of a single layer of material which sufficiently meets the requirements in question, as is the case in broad sectors with metals, for example, aluminum. However, it may be that additional protection, for example, against heat must be provided for the inserted material if, for instance under heat treatment of the covering, excessive temperatures occur in the interior. Furthermore, multilayer composite foils can be used, where each layer is assigned to a specific function. Thus, for example, the use of a plastic foil is possible which may be made of fibrous material and which is coated with a metal layer, e.g. an aluminum foil, as a permeation protection. Thus also plastic-backed aluminum foils can be used, for example. Another possibility is to employ in the realization according to the invention a material that is not permeation-proof, on which, in the mounted state, a cover foil of permeation-proof material, e.g. of aluminum, is applied over the entire length. The insert itself, regardless of its material, may alternately consist of individual shells, for example, half-shells, which are fitted together with suitable joints, hinges or fitting keys or pins. Advantageous then also is the insert already described which consists of separate lateral parts and a central part, because then the central part remains accessible. For the inserts according to the invention, materials in braided or lattice/grid/trellis type structures can also be used, with the provision of appropriate stiffening elements if needed. In a general way also additional stiffening elements in the form of material reinforcements or inclusions may be used if the rigidity and strength of the inserts must be increased. This is the case especially with thin and light insert forms. Hoses or flexible tubes divided lengthwise or undivided made of heat-shrinkable material may be used as a protective covering over the inserts according to the invention. These may be shrink-fitted upon a supply of heat on the inserts below them.

I claim:

1. An insert for an electrical cable sleeve, consisting of an approximately rectangular central part and at least one contiguous lateral part which has incisions starting from the outwardly directed end, whereby strips are formed which serve to bridge the difference in diameter between the central part and an introduced cable, wherein incision angles are formed by the incisions in the lateral part extending obliquely in the same direction relative to the longitudinal axis of the insert, in such a way that in the mounted state of the insert the strips can be turned into the reduced diameter.

2. An insert according to claim 1, wherein the strips of the lateral part form together with a central part a single unit.

3. An insert according to claim 1, wherein the lateral part is formed as a separate unit, the strips being held together by a band type part, and wherein the lateral part can be joined to a separate central part.

4. An insert according to claim 1, wherein the central part is connected with two lateral parts.

5. An insert according to claim 4, wherein the incisions in both lateral parts are cut in codirectional angles to the longitudinal direction.

6. An insert according to claim 4, wherein the incisions in both lateral parts are cut in oppositely directed angles to the longitudinal direction.

7. An insert according to claim 1, wherein the incision angles are between 10 and 70 degrees.

8. An insert according to claim 1, wherein the incision angles are equal.

9. An insert according to claim 1, wherein the incision angles are different.

10. An insert according to claim 1, wherein the incisions are made at equal distances from each other.

11. An insert according to claim 1, wherein the incisions are made at unequal distances from one another.

12. An insert according to claim 1, wherein the incisions are of equal length.

13. An insert according to claim 1, wherein the incisions have different lengths.

14. An insert according to claim 1, wherein the incisions are formed as narrow jogs.

15. An insert according to claim 1, wherein the ends of strips have rounded portions.

16. An insert according to claim 1, wherein the incisions are of equal depth, and wherein the strips have different lengths.

17. An insert according to claim 16, wherein the individual strips of different length are arranged alternately.

18. An insert according to claim 16, wherein the strips of different length are arranged in groups.

19. An insert according to claim 18, wherein the groups of strips have at least ones strips of equal length with a strip in another group.

20. An insert according to claim 18, wherein the strips within one group have different length.

21. An insert according to claim 18, wherein individual groups of strips are arranged alternating periodically.

22. An insert according to claim 1, wherein at the inner ends of the strips a bending line is provided crosswise to the longitudinal direction.

23. An insert according to claim 1, wherein logitudinally extending, parallel break or bending lines are provided in the central part.

24. An insert according to claim 1, wherein said insert is formed from a latticed or braided material.

25. An insert according to claim 1, wherein said insert consists of at least one layer of uniform material.

26. An insert according to claim 1, wherein said insert consists of a multilayer composite foil.

27. An insert according to claim 25, wherein the insert consists of at least one layer of metallic material.

28. An insert according to claim 27, wherein the insert contains an additional layer of heat-insulating material.

29. An insert according to claim 26, wherein said insert is constructed in the form of a composite foil comprising superposed layers of plastic, fibrous material, and a metal foil.

30. An insert according to claim 26, wherein said insert is constructed in the form of a composite foil comprising at least a layer of aluminum-backed plastic.

31. An insert according to claim 1, wherein said insert consists of a material that is not permeation-proof and includes a cover foil of aluminum permeation-proof material, applied over one surface area.

32. An insert according to claim 1, wherein said insert is formed of first and second half-shells.

33. An insert according to claim 1, wherein the central part is formed of first and second half-shells.

34. An insert according to claim 1, wherein the strips are at least partly tapered outwardly toward their ends.

35. A method for the production of an electrical cable sleeve insert for mounting, over a cable splice, consisting of the steps of:
  winding a rectangular central part of an insert in which lateral parts are attached to each end of the central part around cable splice material to be wrapped;
  turning obliquely projecting strips of each respective lateral part of the insert inwardly or outwardly by light application of pressure and with a simultaneous rotational movement in a direction given by incision angles of incisions in the lateral part forming the strips to the longitudinal direction of the rectangular central part to reduce a diameter of the insert; and
  applying a protective covering over the mounted insert.

36. A method of production according to claim 35, further including the step of fixing the insert in the mounted position with the protective covering clamped on over it.

37. A method according to claim 35, further including the step of shrink fitting the protective covering over the mounted insert, with said protective covering being comprised of shrinkable plastic material.

* * * * *